June 6, 1939.  B. R. GRANBERG  2,160,858
MACHINE TOOL
Filed March 30, 1937   2 Sheets-Sheet 1
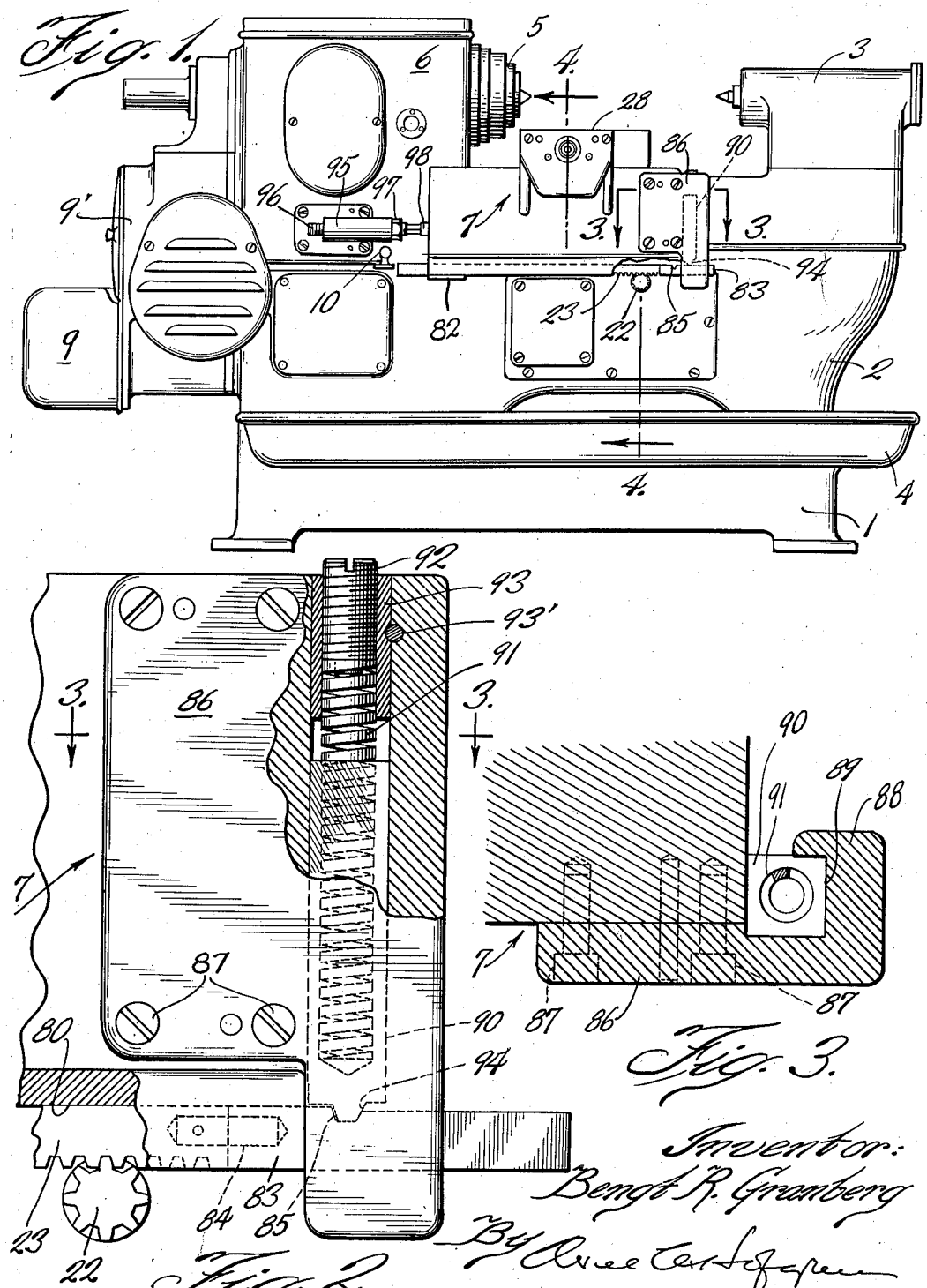

June 6, 1939. B. R. GRANBERG 2,160,858
MACHINE TOOL
Filed March 30, 1937 2 Sheets-Sheet 2

Inventor:
Bengt R. Granberg
By Axel␣A.␣Carlson
his Atty.

Patented June 6, 1939

2,160,858

UNITED STATES PATENT OFFICE 2,160,858

MACHINE TOOL

Bengt R. Granberg, Rockford, Ill., assignor to Sundstrand Machine Tool Co., Rockford, Ill., a corporation of Illinois Application March 30, 1937, Serial No. 133,868

12 Claims. (Cl. 82—21)

The invention relates to machine tools and is particularly concerned with an automatic carriage mechanism.

The principal object of the invention is to provide in a machine tool, having a tool carriage reciprocated by driving mechanism, new and improved means for automatically releasing the carriage from the driving mechanism at the end of the tooling movement of the carriage to obtain a more accurate arrest of the carriage than can be obtained by stopping or reversing the driving mechanism.

Another object of the invention is to provide in a machine tool, having a tool carriage reciprocated by a driving mechanism, new and improved means for automatically releasing the carriage from the driving mechanism at the end of the tooling movement of the carriage to permit continued operation of the mechanism in order to complete other operations of the machine.

Yet another object is to provide in a machine tool, having two or more tool carriages positively driven by the same driving mechanism, means for releasing one of the carriages from the driving mechanism at a pre-selected position in its tooling movement in order to permit any other carriages to continue to be driven by the mechanism.

Still another object is to provide, in a machine tool having a tool carriage reciprocated by driving mechanism through a cycle including forward and return movement, new and improved means for positively connecting the carriage and the driving mechanism during the forward movement of the carriage and operable upon engagement of the carriage with a positive stop to release the carriage from the driving mechanism and then automatically re-engage the carriage and the mechanism after reversal of the mechanism to effect return movement of the carriage.

A further object is the provision, in a lathe having a longitudinally reciprocating tool carriage and a driving mechanism for actuating the same, of a new and improved automatically releasable connection between the carriage and the driving mechanism permitting the driving mechanism to continue its operation after the carriage has been positively stopped at the end of its forward movement.

Yet a further object is the provision, in a machine tool, having a reciprocating tool carriage and a driving mechanism including a rack slidably mounted on the carriage, of plunger means mounted on the carriage and normally mechanically engaged with the rack positively to drive the carriage and adapted upon positive arrest of the carriage to be cammed out of driving engagement with the rack and thus permit continued movement of the rack while the carriage remains stationary.

Other objects and advantages will become apparent from the following detailed description taken in connection with the accompanying drawings, in which:

Fig. 1 is a front elevational view of a lathe equipped with my invention.

Fig. 2 is a fragmental enlarged view partially in section of a portion of the machine showing my improved carriage release.

Fig. 3 is a partial section taken on the line 3—3 of Fig. 1, looking in the direction of the arrows.

Figure 4:
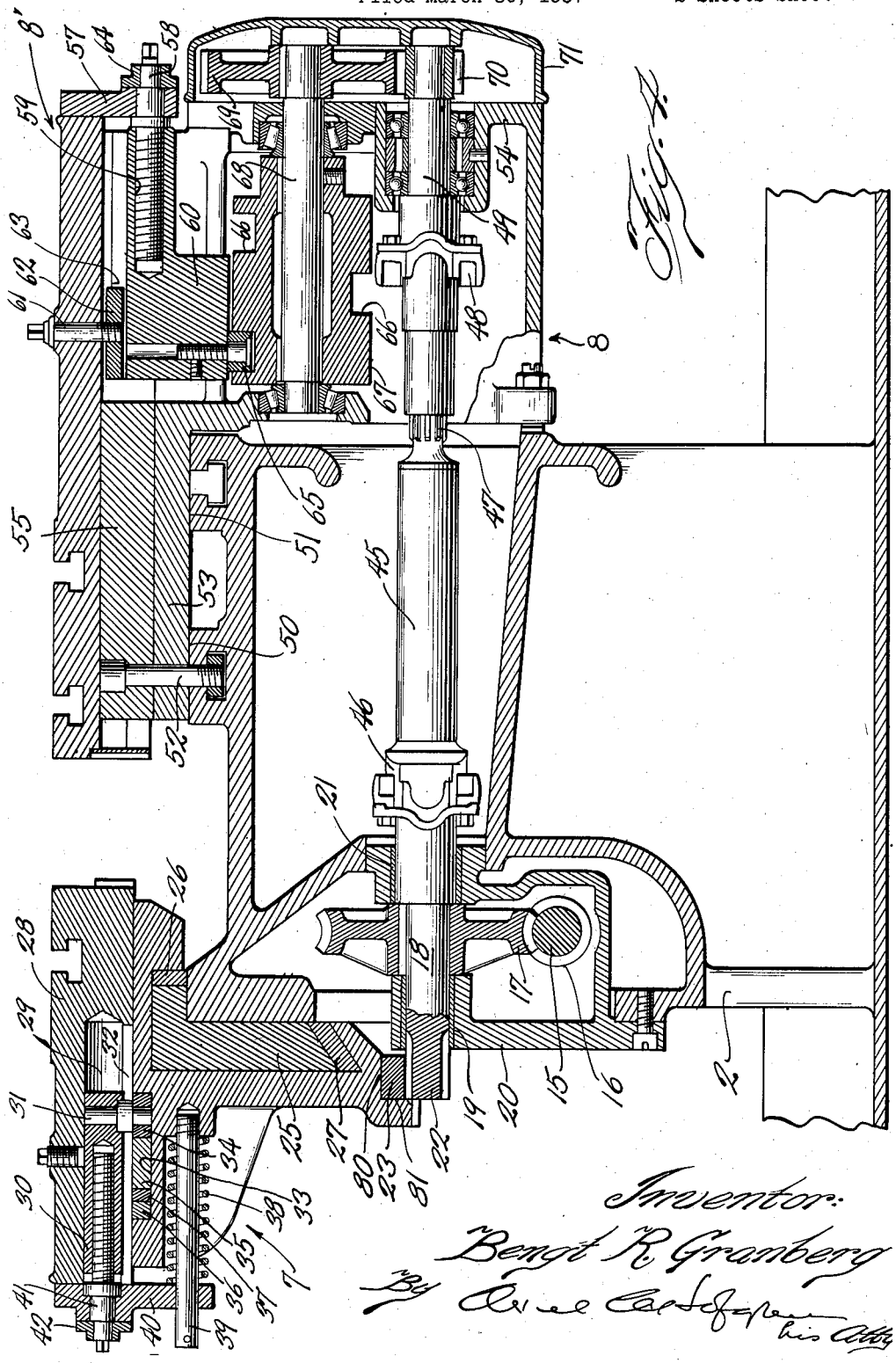
Fig. 4 is a partial cross section of the machine taken on the line 4—4 of Fig. 1 looking in the direction of the arrows.

While there is illustrated in the drawings and shall hereinafter be described in detail a preferred form of the invention, it is to be understood that the invention is not limited to the particular construction and arrangement shown, it being contemplated that various changes may be made by those skilled in the art without departing from the spirit and scope of the invention as expressed in the appended claims.

As a convenience and economy of operation, it is sometimes desirable to have all the power transmission elements in a machine tool positively operable at all times. There is likewise a demand for the carriages of the machine tool to have a sequential intermittent movement and if both features are to be employed, some means which will provide for a temporary disengagement of one from the other will be highly advantageous. With this aim in view, the present invention is directed to an automatic release of the carriage from the driving mechanism and an automatic re-engagement for the same.

The preferred embodiment of my invention is herein shown attached to a machine tool which, as represented, is a lathe comprising a base 1 supporting a bed 2 and a tailstock 3 at one end of the bed, all formed as an integral part of a single casting, well ribbed to provide strength and rigidity. Also cast integrally with the base and the bed at the juncture thereof is a coolant and chip trough 4 extending around three sides of the lathe. A spindle 5 driven by an electric motor (not shown) is rotatably mounted in a headstock 6 also cast integrally with the base and the bed. The lathe is further provided with a longitudinally reciprocating front carriage, designated generally as 7, and a rear support, generally designated 8, which is adjustable longitudinally of the machine and carries a tool carriage 8', in the nature of a cross-slide reciprocable transversely of the machine. By means of the spindle motor mentioned, a rapid traverse motor housed in the casing 9, and suitable gearing housed in the casing 9', the front carriage 7 is driven through a suitable cycle including traverse and feed movements and the cross-slide 8' is likewise driven through a given cycle. Control of the machine is semi-automatic with a cycle of operation initiated by means of the lever 10.

Details of the structure and operation of the lathe are more fully shown and described in a copending application Serial No. 66,463, filed February 29, 1936, jointly by Bengt Granberg and John B. Sinderson.

As best seen in Fig. 4, the driving mechanism for the carriage and slide includes a horizontally disposed shaft 15 which is connected by means of a worm 16 and a worm wheel 17 to a horizontally extending shaft 18. The horizontally extending shaft 18 is journaled in a bearing 19 in the front portion of a housing 20, and in a bearing 21 in the rear portion thereof. The end of the horizontally extending shaft 18 which projects toward the front of the machine, as viewed in Fig. 1, has the form of a pinion 22 which cooperates with a rack 23 releasably attached to the front carriage 7, the operation of which will be subsequently described in detail.

To prolong the life of the machine and to obtain greater precision in operation, the front carriage 7 slides on a hardened and ground steel way 25 secured to the bed 2. The carriage is adjusted and wear compensated for by means of a gib 26 and a tapered gib 27 interposed between the vertical and inclined surfaces respectively of the carriage and the way 25. Supported on the carriage is a cross slide 28 adapted to support a tool (not shown). This slide is formed with a longitudinal bore 29 in which is movable a cylindrical member 30. At its inner end, the cylindrical member 30 carries a pin 31 projecting downwardly through a slot 32 formed in the slide, and into a groove 33 in the upper face of the carriage 7. At the end projecting into the groove 33, the pin 31 carries a roller 34 adapted to engage a cam bar 35 providing automatic feed-in of the tool. Also disposed in the groove 33 are bars 36 and 37 providing for automatic tool relief at the end of the cut. The cam bar 36 is suitably secured to the bed 2 of the lathe and the bars 36 and 37 are shifted relative to one another at the beginning and the end of the cut as more particularly described and claimed in the patent to Timothy B. Buell No. 2,002,933, issued May 28, 1935. The roller 34 is held in engagement with the cam bar 35 by a compression spring 38 held in place by a rod 39 and at one end abutting the carriage 7 and at the other end abutting a plate 40 secured to the end of the slide 28. Rotatable in the plate 40, but held against axial movement relative thereto, is a micrometer screw 41 threaded into the cylindrical member 30. The projecting end of the micrometer screw 51 is formed to receive a tool and carries a dial 42 to facilitate accurate adjustment of this slide transversely of the carriage by rotation of the screw 41.

To drive the rear tool slide 8', the transversely extending shaft 18 is connected at its inner end to another transverse shaft 45 by means of a universal joint 46. The shaft 45 is in turn provided with an extensible splined connection 47 and is joined on the other side of the splined connection by a second universal joint 48 to a shaft 49.

As previously stated, the slide 8' is mounted on the rear support 8 which is manually slidable longitudinally along the bed on ways 50 and 51 and may be secured in adjusted position by bolts 52. The support is formed with a horizontal portion 53 and a depending vertical portion 54, with the slide 8' slidable on a guideway 55 constituting part of the horizontal portion. A plate 57 is secured to the rear of the slide and in it is journaled a micrometer screw 58 threaded into a bore 59 in a block 60. This block is releasably secured beneath the slide 8' by means of a bolt 61 threaded into a T-nut 62 in a transverse T-slot 63 located in the upper surface of the block. At its outer end the micrometer screw 58 carries a Vernier dial 64 and is formed for the reception of a tool for rotating the screw to adjust the slide 8' relative to the block 60.

The cross slide 8' is reciprocated transversely of the lathe in timed relation to the movement of the front carriage 7. To that end there is secured beneath the block 60 a roller 65 projecting into a cam groove 66 formed in the periphery of a drum cam 67. The cam is keyed to a shaft 68 journaled in the rear support transversely thereof, and fast on the outer end of the shaft is a gear 69 meshing with a pinion 70 secured to the outer end of the short parallel shaft 49. The gears 69 and 70 constitute change gears and are removably retained on the ends of the shafts 68 and 49 by a cover 71 removably secured to the rear support. The inner end of shaft 49, as has been previously described, is secured by means of the universal joint 48 to the transverse shaft 45. It will be apparent that, by the provision of two universal joints in the drive connection from the power unit to the cross-slide of the rear support, said rear support may be adjusted to any position longitudinally of the bed without change or disconnection of the drive to the rear cross-slide. Furthermore, by properly shaping and designing the cam groove 66 the rear carriage may be given any desired movement in some predetermined timed relation with the front carriage.

There are occasions when it is desirable or essential to effect a more precise arrest of a carriage or a slide that can be effected by reversal or stopping of the driving mechanism. Occasion may also arise when it is desirable or essential that the drive of one carriage or slide continue after the arrest of another carriage or slide driven by the same mechanism. Some means needs therefore to be provided to free the carriage or slide from the driving mechanism to obtain precise arrest or to permit continued operation of the driving mechanism for the purpose of actuating the other carriage or slide. In order to satisfy this requirement in the present embodiment, a novel releasable connecting means has been provided between the front carriage and the pinion 22 which supplies the driving force for reciprocating the carriage.

The releasable features are embodied in a measure in the rack 23, briefly referred to in the first part of this description, which is positively driven by the pinion 22 and which is in turn releasably connected with the front carriage 7. The rack is slidable with respect to the front carriage and is supported in intersecting ways 80 and 81 of the carriage by the pinion 22 at one end and a plate 82 (Fig. 1) at the other end. At the right end of the rack, as viewed in Fig. 2, there is a hardened steel extension 83 removably secured to the rack by some conventional means 84. The extension is provided with a transverse cam slot 85 having sloping sides. Mounted on the front side of the front carriage 7 is a bracket plate 86 bolted thereto by means of the bolts 87, the bracket plate 86 being extended in the form of a hook-shaped section 88 providing a vertical, square guideway 89. Within the guideway a square, spring pressed plunger 90 is mounted and held in place by the agency of a heavy helical spring 91 adjustably secured by a set screw 92 which is threaded into a bushing 93 secured in the bracket plate 86 by the pin 93'. The bottom of the plunger has a protruding cam-like element 94 whose sloping sides coincide with the sides of the cam slot 85 formed in the adjustable extension 83.

There is additionally provided on the bed 2 a positive, adjustable stop for the carriage 7 comprising a block 95 having therein a threaded bolt 96 upon which is positioned a lock nut 97 for holding it in any desired position. The screw 96 is provided with a cap 98 forming a positive stop for the carriage at the end of its tooling movement at the left hand end of the ways.

When the lathe is in operation the front carriage, as viewed in Fig. 1, driven by the feeding mechanism, travels from the right toward the left of the machine, and while it is being moved in this direction the mechanism is serving to rotate the drum cam 67. When the carriage reaches the end of its stroke it is positively stopped by means of the block 95 and screw 96. Since the feeding means continues to operate, the pinion 22 continues to drive the rack 23 toward the left and in so doing forces the plunger 90 out of contact with the extension 83 of the slide by means of the wedge-shaped contact of the cam 94 with the sloping sides of the transverse slot 85. As the rack continues its motion toward the left unaccompanied by the front carriage, the feeding mechanism continues to drive the rear carriage through its crosscut stroke until a suitable mechanism stops the forward operation of the feeding means, then all of the parts are returned to their initial positions and as the rack 23 is driven in reverse direction from left to right the transverse slot 85 again moves underneath the plunger 90 and the cam 94 on the bottom of the plunger again engages the slot 85, thus remaking the yieldable connection between the carriage and the rack and the carriage is then driven by reverse motion of the feeding means to its initial position.

I claim as my invention:

1. In a machine tool having a bed, a reciprocating support mounted on the bed and power means for operating the support, the combination of a member positioned adjacent the support, an element cooperable with the member operated by the power means for driving said member, yieldable engaging means releasably interconnecting said support and said member during a portion of the operation and releasable solely as a result of continuing operation of the power means when the carriage is positively arrested, and means secured to the bed for arresting movement of the support and thereby causing release of the engaging means during continued operation of the power means.

2. In a machine tool having a bed, a carriage reciprocably mounted on the bed for forward and return movement, power means for driving the carriage including a member driven through forward and reverse movement and mounted for movement relative to the carriage, and a positive stop for arresting the carriage at the end of its forward movement, a releasable driving connection interposed between said carriage and said power means comprising an element mounted on said carriage and a cooperating element formed on said member, resilient means urging said elements into interengaging position to form a positive driving connection between said carriage and the member, said elements being operable solely as a result of the greatly increased driving force due to the continued operation of said power means after arrest of said carriage by engagement thereof with the positive stop to overcome said resilient means and disengage to permit continued operation of said power means after arrest of said member.

3. In a machine tool having a bed, a carriage reciprocably mounted on the bed for forward and return movement, power means for driving the carriage, and a positive stop for arresting the carriage at the end of its forward stroke, releasable driving means interposed between said carriage and said power means for permitting continued operation of said power means after arrest of said carriage by engagement with the positive stop comprising a rack mounted on the carriage for sliding movement relative thereto and associated with the power means to be driven thereby, said rack having a notch formed in the surface thereof, a plunger having a beveled end adapted to be received in said notch to provide a positive driving engagement between the rack and said carriage, and a spring urging said plunger into engagement with said notch, the beveled surfaces of the end of said plunger operating upon arrest of the carriage by said positive stop to cam the plunger out of the notch in order to release the carriage from the power means.

4. A machine tool comprising, in combination, a bed, a carriage reciprocably mounted on the bed, driving mechanism operable to drive said carriage through a forward and return movement, a positive stop for arresting the carriage at the end of its forward movement, and a yieldable engaging means for connecting said carriage with said driving mechanism for impelling the carriage through its forward movement, said means being operable solely as a result of the greatly increased driving force due to the continuing operation of said driving mechanism after arrest of the carriage by said positive stop to disengage said driving mechanism from the carriage and operable upon reverse actuation of the driving mechanism to re-engage the carriage therewith to impart a return movement to the carriage.

5. A machine tool comprising, in combination, a bed, a carriage reciprocably mounted on the bed for forward and return movement, power means operable to drive said carriage through a forward and return movement including a member mounted for reciprocation relative to said carriage and driven through forward and reverse movement, a positive stop for arresting the carriage at the end of its forward movement, and connecting means operable to engage said member for connecting said carriage to move with the member, said means being urged toward engaged position and yieldable solely as a result of the greatly increased driving force due to continued operation of said power means after arrest of the carriage by engagement with the positive stop to release said carriage from the member.

6. A machine tool comprising, in combination, a bed, a carriage reciprocably mounted on the bed for forward and return movement, power means operable to drive said carriage through forward and return movement including a rack slidably mounted in said carriage, a notch formed in the surface of said rack, said notch having sloping sides, a plunger supported on said carriage and having a beveled end adapted to project into the notch, and a spring for urging said plunger in a direction to engage said notch, said plunger when engaged with the notch forming a driving connection between the rack and the carriage and operating to release the carriage from the rack when the carriage has been brought to rest by engagement with the positive stop.

7. In a machine tool having a bed, a plurality of carriages reciprocably mounted on the bed, a single power means for driving both of the carriages, and a positive stop for arresting one of the carriages at the end of its forward movement, a releasable engaging means for interconnecting said power means and one of said carriages to drive the carriage through its forward movement, said means being operable automatically as an incident to the reaction between said means and the power means to release said carriage from said power means upon arrest of the carriage by engagement with the positive stop while the power means continues to drive the remaining carriage, and operable upon reverse actuation of said power means automatically again to interconnect said power means and said carriage for driving the carriage upon its return movement.

8. In a machine tool equipped with a plurality of reciprocating tool carriages mounted on a bed and power means for operating said carriages, the combination of a rack element slidably secured to one of said carriages having an engaging means thereon, a pinion operated by the power means for driving the rack, a second engaging means secured to the one of said carriages yieldably urged toward releasable engagement with said first engaging means to secure said carriage and rack together during a portion of the operation, and a shoulder portion on the bed for stopping the movement of said carriage causing disengagement of the engaging means by continuation of operation of the power means to drive the remaining carriage.

9. In a machine tool equipped with a plurality of tool carriages mounted on a bed, driving mechanism for operating the carriages and a carriage arresting element located on the bed, the combination of an elongated member adjacent one of said carriages, slidable with respect thereto and having an extension containing a wedge-shaped cam slot on one face thereof, gear means connected with the driving mechanism for reciprocating said elongated member, and a plunger attachment secured to and carried by said one carriage having a wedge-shaped cam resiliently mounted thereon and positioned to spring into and out of engagement with the cam slot, adjustable means for regulating the pressure on the cam, said cam and slot engagement being operable to secure said one carriage to the elongated member during a portion of its operation and operable to be released by operation of the driving mechanism upon said elongated member when said carriage contacts the arresting element to permit said elongated member to continue its movement unaccompanied by said one carriage while said other carriage continues to be operated by the driving mechanism.

10. A machine tool comprising a bed, a plurality of carriages reciprocably mounted on the bed, driving mechanism for actuating the carriages having a single source of power, a positive stop mounted on the bed and disposed to abut one of the carriages at the end of its movement to arrest the same, and a releasable engaging means for interconnecting said driving mechanism and the one of said carriages disposed to abut the positive stop operable to disconnect the carriage from said driving mechanism while the driving mechanism continues to actuate the other carriage comprising a member mounted upon the carriage yieldably engaging said driving mechanism automatically to disengage upon arrest of the carriage and operable upon reverse actuation of the driving mechanism automatically again to reengage the driving mechanism to actuate the carriage through a return movement.

11. A machine tool comprising a bed, a plurality of carriages reciprocably mounted on the bed for forward and return movement, driving mechanism for one of the carriages including a rack slidably mounted on the carriage, driving mechanism for the other carriage, said driving mechanisms being continuously operated throughout a cycle of the machine and deriving power from a common source, a positive stop disposed to be abutted by the one of said carriages at the end of its forward movement to be arrested thereby, and a releasable connection between said rack and the one of said carriages for permitting arrest of the carriage while the driving mechanism continues to actuate the other carriage comprising engaging means formed on the rack, cooperating cam means carried by the carriage and adapted to engage the means on the rack to interconnect the rack and the carriage so that the same may reciprocate as a unit, and spring means yieldably urging the cam means into engagement with the means on the rack to retain the rack and the carriage releasably interconnected when movement of the carriage is not prevented by the positive stop.

12. A machine tool comprising a bed, a plurality of carriages reciprocably mounted on the bed for forward and return movement, driving mechanism for one of the carriages including a rack slidably mounted on the carriage, driving mechanism for the other carriage, said driving mechanisms being continuously operated throughout a cycle of the machine and deriving power from a common source, a positive stop disposed to be abutted by the one of said carriages at the end of its forward movement to be arrested thereby, and a releasable connection between said rack and the one of said carriages for permitting arrest of the carriage while the driving mechanism continues to actuate the other carriage comprising a removable steel extension adapted to be secured to the end of said rack, said extension having a transverse notch formed in the surface thereof with the transverse walls inclined downwardly and inwardly, a plunger reciprocably mounted on the carriage and terminating in a beveled end adapted to be received in the notch on said extension, and a spring urging said plunger into engagement with the notch whereby the carriage is connected to move with the rack during the major portion of its forward and reverse movement but is disengaged by the cam action of the notch and the beveled end when the carriage is arrested by the positive stop.

BENGT R. GRANBERG.